United States Patent
Asaro et al.

(10) Patent No.: US 12,254,795 B2
(45) Date of Patent: Mar. 18, 2025

(54) DISPLAY OF SECURITY INFORMATION BASED ON SPLITTING INTO IMAGES VIEWABLE AT A CERTAIN READING DISTANCE

(71) Applicant: INTERNATIONAL BUSINESS MACHINES CORPORATION, Armonk, NY (US)

(72) Inventors: Alessandra Asaro, Rome (IT); Chiara Conti, Rome (IT); Remo Freddi, Ronciglione (IT); Roberto Ragusa, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/643,629

(22) Filed: Dec. 10, 2021

(65) Prior Publication Data

US 2023/0186801 A1 Jun. 15, 2023

(51) Int. Cl.
*G09G 3/00* (2006.01)
*G06Q 20/34* (2012.01)

(52) U.S. Cl.
CPC ............. *G09G 3/003* (2013.01); *G06Q 20/34* (2013.01); *G09G 2358/00* (2013.01)

(58) Field of Classification Search
CPC ...................................................... G09G 3/003
See application file for complete search history.

(56) References Cited

U.S. PATENT DOCUMENTS

| 834,048 | A | 10/1906 | Deeks |
| 856,519 | A | 6/1907 | Hiram |
| 4,765,656 | A * | 8/1988 | Becker ................ B42D 15/00 283/70 |
| 8,025,239 | B2 | 9/2011 | Labrec |

(Continued)

FOREIGN PATENT DOCUMENTS

| CN | 107995894 A | 5/2018 |
| CN | 110139105 A | 8/2019 |

(Continued)

OTHER PUBLICATIONS

Disclosed Anonymosly, "Visual Cryptography", 101 Computing. net, Jan. 11, 2020, 6 Pages. https://www.101computing.net/visual-cryptography/.

(Continued)

*Primary Examiner* — William Boddie
*Assistant Examiner* — Andrew B Schnirel
(74) *Attorney, Agent, or Firm* — Rakesh Roy

(57) ABSTRACT

A device and method for displaying security information to a user is provided. The present invention may include a security device configured to display a security information on a display surface. The security information may include at least one component having two images based on a splitting of its representation that are viewable from corresponding angles of view. The images may be fused into the representation of the at least one component by a visual system of the user looking at them at a reading distance causing the eyes of the user to look at the images from the corresponding angles of view. A corresponding method for displaying security information to a user is also provided.

17 Claims, 8 Drawing Sheets

(56) References Cited

U.S. PATENT DOCUMENTS

| | | | |
|---|---|---|---|
| 10,639,925 B2 | 5/2020 | Fuhse | |
| 2002/0163729 A1 | 11/2002 | Myers | |
| 2007/0040780 A1* | 2/2007 | Gass | G02F 1/134363 |
| | | | 345/87 |
| 2008/0088880 A1 | 4/2008 | Alasia | |
| 2008/0278640 A1* | 11/2008 | Ijzerman | H04N 13/361 |
| | | | 348/E13.044 |
| 2010/0214324 A1* | 8/2010 | Broughton | G09G 3/3648 |
| | | | 345/60 |
| 2014/0191500 A1 | 7/2014 | Holmes | |
| 2014/0233856 A1 | 8/2014 | Cvetkovic | |
| 2014/0300095 A1* | 10/2014 | Tompkin | B42D 25/342 |
| | | | 283/67 |
| 2015/0062315 A1* | 3/2015 | Davis | H04N 13/332 |
| | | | 348/56 |
| 2015/0070350 A1 | 3/2015 | Cape | |
| 2017/0106689 A1 | 4/2017 | Fuhse | |
| 2017/0160550 A1* | 6/2017 | Kobayashi | G02B 27/017 |
| 2018/0333977 A1* | 11/2018 | Van Den Berg | G03F 7/0002 |
| 2020/0307299 A1* | 10/2020 | Van Dijk | B42D 25/41 |
| 2021/0375169 A1 | 12/2021 | Walters | |

FOREIGN PATENT DOCUMENTS

| | | |
|---|---|---|
| DE | 102012021724 A1 | 5/2014 |
| KR | 20140052593 A | 5/2014 |
| TW | 200902339 A | 1/2009 |

OTHER PUBLICATIONS

Oglesby, "Lenticular Encryption by Prosthetic Knowledge", Mar. 4, 2014, 1 Page. https://blog.adafruit.com/2014/03/04/asdfasdf.

Patel, et al., "Robust Watermarking for Anaglyph 3D images Using DWT Techniques", International Journal of Engineering and Technical Research (IJETR), ISSN: 2321-0869, vol. 3, Issue-6, Jun. 2015, 4 Pages. https://ieeexplore.ieee.org/document/6637219.

Stinson, "Doug Stinson's Visual Cryptography Page," Apr. 17, 2003, https://cs.uwaterloo.ca/~dstinson/visual.html, 2 pages.

Wikipedia, "Lenticular Printing", Last Edited Dec. 2, 2021, 17 Pages. https://en.wikipedia.org/wiki/Lenticular_printing.

International Searching Authority, "Notification of Transmittal of the international Search Report and the Written Opinion of the International Searching Authority, or Declaration," Patent Cooperation Treaty, Dec. 7, 2022, 15 pages, International Application No. PCT/EP2022/084725.

Lee, et al., "3DPIN: Enhancing security with 3D display", IEEE, Oct. 7-10, 2014, 3 Pages. https://ieeexplore.ieee.org/abstract/document/7031090.

* cited by examiner

DISPLAY OF SECURITY INFORMATION BASED ON SPLITTING INTO IMAGES VIEWABLE AT A CERTAIN READING DISTANCE

BACKGROUND

The present disclosure relates to the security field. More specifically, this disclosure relates to security information.

The background of the present disclosure is hereinafter introduced with the discussion of techniques relating to its context. However, even when this discussion refers to documents, acts, artifacts and the like, it does not suggest or represent that the discussed techniques are part of the existing solutions or are common general knowledge in the field relevant to the present disclosure.

Security is of utmost importance in several situations. Particularly, this is the case when services are to be provided only to users being authorized to receive them. Typical examples are electronic payments (e-payments) required in e-commerce transactions for buying goods via online merchants over the Internet. Generally, the e-payments are performed by using credit cards. However, each payment of this type involves a Card-Not-Present (CNP) transaction, wherein it is not possible for a cardholder to present the credit card physically for a visual examination thereof to the merchant; therefore, other security measures are to be implemented in order to ensure that the actual cardholder is indeed authorizing the e-payment.

A commonplace technique for controlling the delivery of services only to its (authorized) users is of requiring the provision of security information, which should be possessed by users to prove their entitlement to obtain the services. Particularly, in case of an e-payment by credit card the cardholder has to enter, in addition to credit card number, cardholder name and expiration date, a Card Security Code (CSV). The (card) security code is used by the merchant to verify that the user has the credit card in his/her possession.

Whenever the security information has to be transmitted remotely over a public telecommunication network (such as in the Internet), several techniques are available to secure its transmission. For example, encryption protocols, such as the Transport Layer Security (TLS) protocol, are commonly used to provide privacy and data integrity of communications over the network. This allows protecting the security information from sniffing attacks, since even if the transmission of the security information is intercepted, the security information is in an encrypted form so that it is not possible to recover its actual content.

However, in most practical situations the security information is to be read by the user from a corresponding device. For example, this happens when the security information is very difficult to be remembered by the user. Particularly, in case of a credit card its identification information (i.e., credit card number, cardholder name and expiration date) is embossed on a front surface of the credit card, whereas its security code is typically printed on a back surface of the credit card.

Therefore, any use of the credit card in a public location (such as in a shop) exposes its cardholder to the risk of eavesdropping. In fact, whenever the cardholder pulls out the credit card from his/her wallet and passes it to a cashier of the shop, everybody in proximity of the cardholder might look at the credit card stealthily in order to acquire the corresponding information. Even more dangerous, cameras may be used to shoot the credit card when it is exchanged between the cardholder and the cashier from a relatively long distance; in this way, the information relating to the credit card may be stolen in a completely unaware way for the cardholder.

A similar risk also exists for security information that is retrieved by a user from a mobile computing device thereof, such as a smartphone. In fact, several security apps and on-line services are available for storing a number of pieces of security information in an encrypted database. Particularly, the security information often comprises Personal Identification Numbers (PINs) of payment cards (such as debit/credit cards) of the user; the PINs are used to authorize transactions with the corresponding payment cards, such as payments at Point-Of-Sale (POS) terminals and withdrawals at Automatic Teller Machine (ATM) terminals. Particularly, the security apps store the encrypted database locally in the smartphone (being accessible directly); instead, the on-line services store the encrypted database remotely (being accessible via the Internet). In both cases, a single master password is used to unlock the encrypted database to access the security information that is stored therein.

Whenever the user needs to use one of his/her payment cards, the user unlocks the encrypted database (by entering its master password) and selects a corresponding entry in the encrypted database for displaying the PIN of the payment card on the screen of the smartphone; the user may then read the PIN and enter it into a POS/ATM terminal as required to complete a corresponding (payment/withdrawal) transaction. Therefore, in this case as well everybody in proximity of the POS/ATM terminal might look at the screen of the smartphone stealthily in order to acquire the PIN or cameras may be used to shoot the screen of the smartphone when it shows the PIN. The payment card may then be stolen and used with its PIN so acquired for performing payments/withdrawals fraudulently.

SUMMARY

Embodiments of the present invention disclose a device and method for displaying security information to a user. In general terms, the present disclosure is based on the idea of providing images viewable from different angles of view.

Particularly, an aspect provides a security device including a display surface and a security information integrated with the display surface. In one embodiment, the security information may include at least one component having a first image and a second image. In one embodiment, the first image and the second image may be associated with splitting a representation of the at least one component. In one embodiment, the first image may be viewable from a first angle of view relative to the display surface and the second image may be viewable from a second angle of view relative to the display surface. In one embodiment, the first image and the second image may be configured to be fused into the representation of the at least one component by a visual system of a user responsive to the user looking at the first image from the first angle of view and the second image from the second angle of view.

According to one advantageous embodiment, the security information may include a plurality of components having corresponding first images and corresponding second images associated with splitting the representation of the plurality of components. In one embodiment, the corresponding first images may be viewable from a corresponding first angle of view relative to the display surface and the corresponding second images may be viewable from a corresponding second angle of view relative to the display surface. In one embodiment, the corresponding first images and the corresponding second images may be fused in succession into the representation of the plurality of components by the visual system of the user responsive to a change of a relative position of the security device with respect to the user looking at the display surface from the corresponding first angles of view and corresponding second angles of view.

According to one advantageous embodiment, the corresponding first angles of view associated with the corresponding first images and the corresponding second angles of view associated with the corresponding first images may be opposite to each other relative to a normal defined by the display surface.

According to one advantageous embodiment, the plurality of components may include corresponding progress elements providing an indication of a progress of a display of the plurality of components responsive to changing the relative position of the security device with respect to the user.

According to one advantageous embodiment, the first image associated with the at least one component may be unable to reveal the representation of the at least one component without the second image associated with the at least one component.

According to one advantageous embodiment, the security information integrated with the display surface may further include a lenticular printing of the first image and the second image.

According to one advantageous embodiment, the display surface may further include a layer of lenticular lenses covering the first image and the second image.

According to one advantageous embodiment, the first image and the second image of the at least one component may further include a plurality of pixel columns that are interleaved. In one embodiment, the first image and the second image of the at least one component may include a perspective distortion to compensate for a lenticular lens distortion.

According to one advantageous embodiment, the first image may include a first color and the second image may include a second color. In one embodiment, the first image and the second image may be fused into the representation of the at least one component by the visual system of the user looking at the display surface with a pair of anaglyph glasses. In one embodiment, the pair of anaglyph glasses may be configured to filter out the second color for a first eye of the user and filter out the first color for a second eye of the user.

According to one advantageous embodiment, the at least one component may be selected from the group consisting of a character, a symbol, a word, and a graphical sign.

A further aspect provides a corresponding method for displaying security information to a user. According to one embodiment, a security device may be provided to a user. In one embodiment, the security device may include a display surface configured to display a security information. In one embodiment, the security information may include at least one component having a representation that is split between a first image and a second image. In one embodiment, the first image and the second image may be viewable from a first angle of view and a second angle of view, respectively, relative to the display surface. In one embodiment, in response to the user looking at the display surface of the security device at a reading distance such that a first eye of the user looks at the first image from the first angle of view and a second eye of the user looks at the second image from the second angle of view, causing a visual system of the user to fuse the first image and the second image into the representation of the at least one component.

According to one advantageous embodiment, in response to the user looking at the display surface of the security device at a first position, the user may detect only the representation of a first component of the plurality of components. In one embodiment, the user may be unable to see the corresponding first images and the corresponding second images associated with other components of the plurality of components from the first position.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE SEVERAL VIEWS OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, like value, content and representation). In this respect, it is expressly intended that the drawings are not necessary drawn to scale (with some details that may be exaggerated and/or simplified) and that, unless otherwise indicated, they are merely used to illustrate the structures and procedures described herein conceptually. Particularly.

DETAILED DESCRIPTION

Figure 1A:
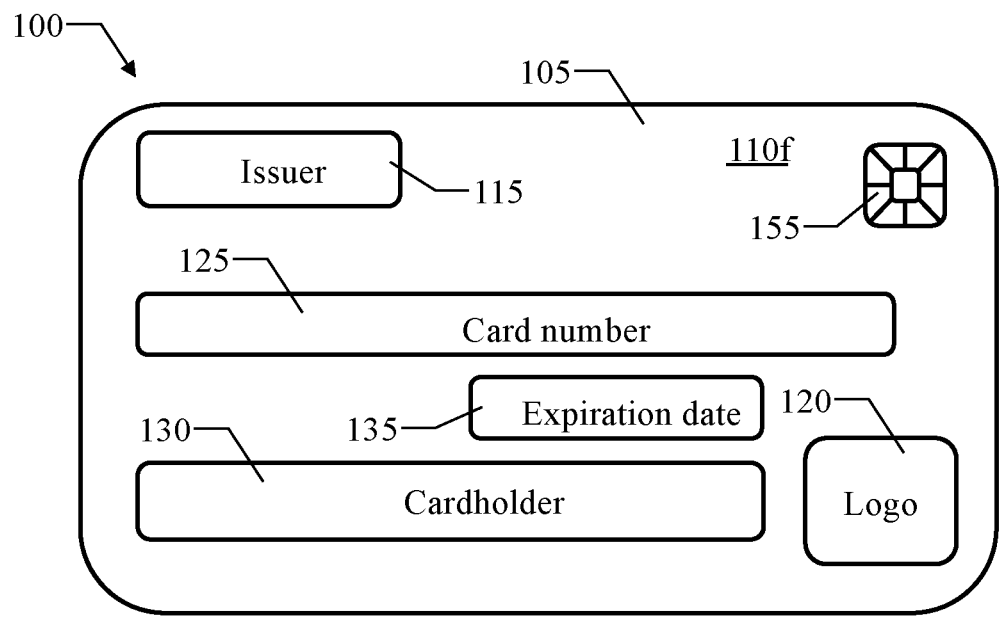
FIG. 1A is a schematic block diagram illustrating a front surface of a card according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

According to one embodiment, a secret code (e.g., security information) may be printed on a card in a particular way, which makes reading possible only for a user actually holding the card. In one embodiment, a process known as "lenticular printing" may permit the overlapping of different images in the same area, such that the different images are individually visible depending on an angle of observation. The images may be divided into tiny columns of pixels that are interleaved horizontally. In one embodiment, on top of the composed mosaic, a plastic corrugated surface may be provided to act as a lens that focuses one of the embedded images by selecting the correct columns. Additionally, it is contemplated that the two different eyes of the user may create two different incidence angles, so they may perceive two different images. The images captured by the two eyes may be fused into a single one by the visual system in the brain, so a final overlapped result is what the user may actually see. According to one embodiment, these mechanisms may be implemented to distribute the characters of the secret code into different frame pairs, that can be consulted in sequence by just slowly rotating the card along the vertical axis.

According to one embodiment, a security code composed of five numerical digits may be considered as an example. In one embodiment, each digit may be embedded into the card separately so the user may see five different images when rotating the card. Each of these image may be encoded as a pair of successive images which may be seen by the left and right eye of the user because of different incident angles for the two eyes.

According to one embodiment, the actual print that goes under the plastic lens may be constructed in the following manner. In one embodiment, each secret digit may be considered an individual frame. As such, in a five digit code, five image frames may be implemented: D1, D2, D3, D4, D5. In one embodiment, each original image may be split into two images that encode the original image when overlapped (visual encryption). As such, the five original images may be split into ten different images: D1a, D1b, D2a, D2b, D3a, D3b, D4a, D4b, D5a, D5b. In one embodiment, a perspective distortion may be applied to the ten images to compensate for different viewing angles. Applying the perspective distortion to the ten images may result in a set of modified images: MD1a, MD1b, MD2a, MD2b, MD3a, MD3b, MD4a, MD4b, MD5a, MD5b. According to one embodiment, the modified images may be embed into the card to create a lenticular printing showing them in sequence from left to right upon rotation. So the final arrangement, from the point of view of the lenticular printing may include: MD1a, MD1b, MD2a, MD2b, MD3a, MD3b, MD4a, MD4b, MD5a, MD5b.

According to one embodiment, the intended observer may hold the card at a distance from the eyes of approximately 20-30 centimeters (cm). The angular parameters of the lenticular technology may be calibrated to that two viewers separated by approximately 6 cm may perceive two different successive frames. Since the human left and right eyes are usually 6 cm apart, the left eye may see frame MD1a while the right eye may see frame MD1b. The two frames may be overlapped in brain perception and give the user a perception of the composed frame D1, where a digit of the secret code is recognizable. The user may then slowly rotate the card along the vertical axis. In one embodiment, next alignment may provide the pair of images MD1b and MD2a, but that pair may not compose visually to anything recognizable. Going on with the rotation, the MD2a, MD2b pair of images may provide a composition of D2, with another secret digit becoming readable. According to one embodiment, the process for reading the security information may include slowing turning the card and getting the sequence of digits. Each digit picture D1, D2, D3, D4, D5 may also including a progress marker that may provide an indication about the sequence number of the digit (e.g., a dot that moves left to right to give an idea similar to a progress bar).

According to one embodiment, the card will not reveal the code when photographed, or photocopied, since only one angle of observation will be captured. It is contemplated that a single angle may reveal only one of the MDxy images, which does not even contain a single digit of the secret code. According to one embodiment, an unauthorized observer may not be able to eavesdrop since the observation geometry will not work. More specifically, a greater distance from the card may break the left-right eye overlapping and a bad angle of observation may not permit the observation of all the subframes, even if the card is being rotated by the owner. As such, in one embodiment, a powerful confidentiality arrangement may be obtained with a plastic grid affixed to a card, that needs no electronics, batteries or other expensive technologies.

The present invention may be a device/apparatus, system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to FIG. 1A-FIG. B, a pictorial representation is shown of a payment card 100 wherein the solution according to an embodiment of the present disclosure may be applied. Particularly, FIG. 1A shows the payment 100 in front view and FIG. 1B shows the payment card 100 in rear view.

The payment card 100 is a plastic card that is issued by a financial institution (issuer) to a corresponding user (cardholder) to enable the cardholder to pay merchants for purchasing goods (products/services), either at POS terminals or on-line, and to withdraw money from ATM terminals. For example, the payment card 100 is a credit card that is linked to a credit line provided by the issuer (such as a bank or a credit union). The credit card 100 has a main body formed by a plastic card 105. The plastic card 105 is an element made of plastic material (such as PVC) having standard size (relatively thin and with a generically rectangular shape).

With reference in particular to FIG. 1A, the plastic card 105 has a front surface 110*f*. An issuer name 115 and an issuer logo 120 are printed on the front surface 110*f*. A card number 125, a cardholder name 130 and an expiration date 135 are embossed on the front surface 110*f*. In case the credit card 100 is a smart card, an integrated chip 155 is embedded in the plastic card 105 for implementing processing functionalities, in either contact or contactless mode.

Figure 1B:
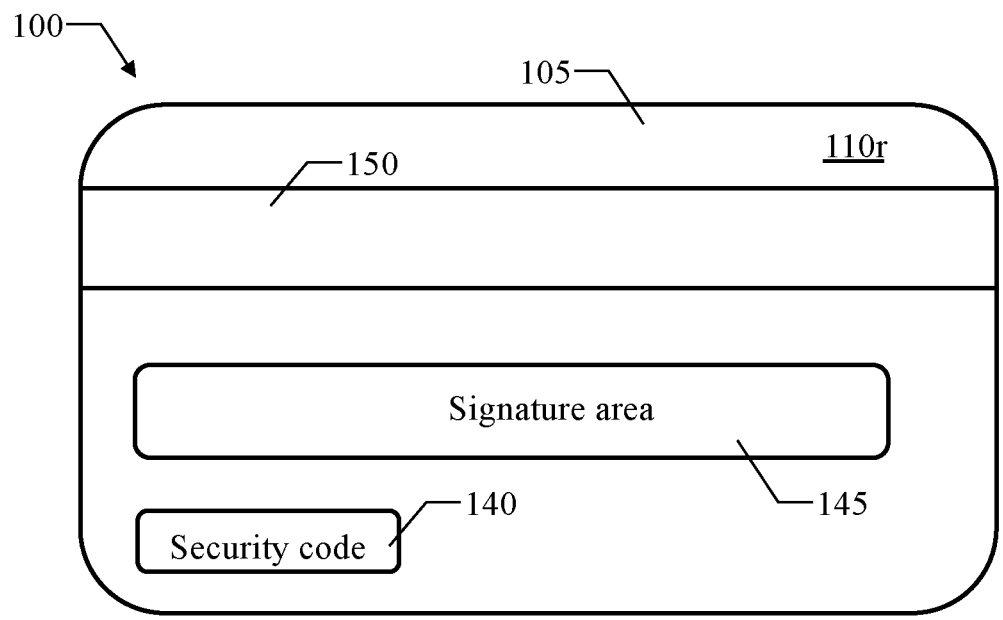
FIG. 1B is a schematic block diagram illustrating a rear surface of a card according to at least one embodiment.

With reference instead to FIG. 1B, the plastic card 105 has a rear surface 110*r*. A card security code (CSV) 140 is printed on the rear surface 110*r*. A signature area 145 is provided for adding a reference signature of the cardholder. A magnetic stripe 150 is embedded in the plastic card 105 for storing identification information of the credit card 100 (i.e., credit card number, cardholder name and expiration date) and its (card) security code 140.

Figure 2A:
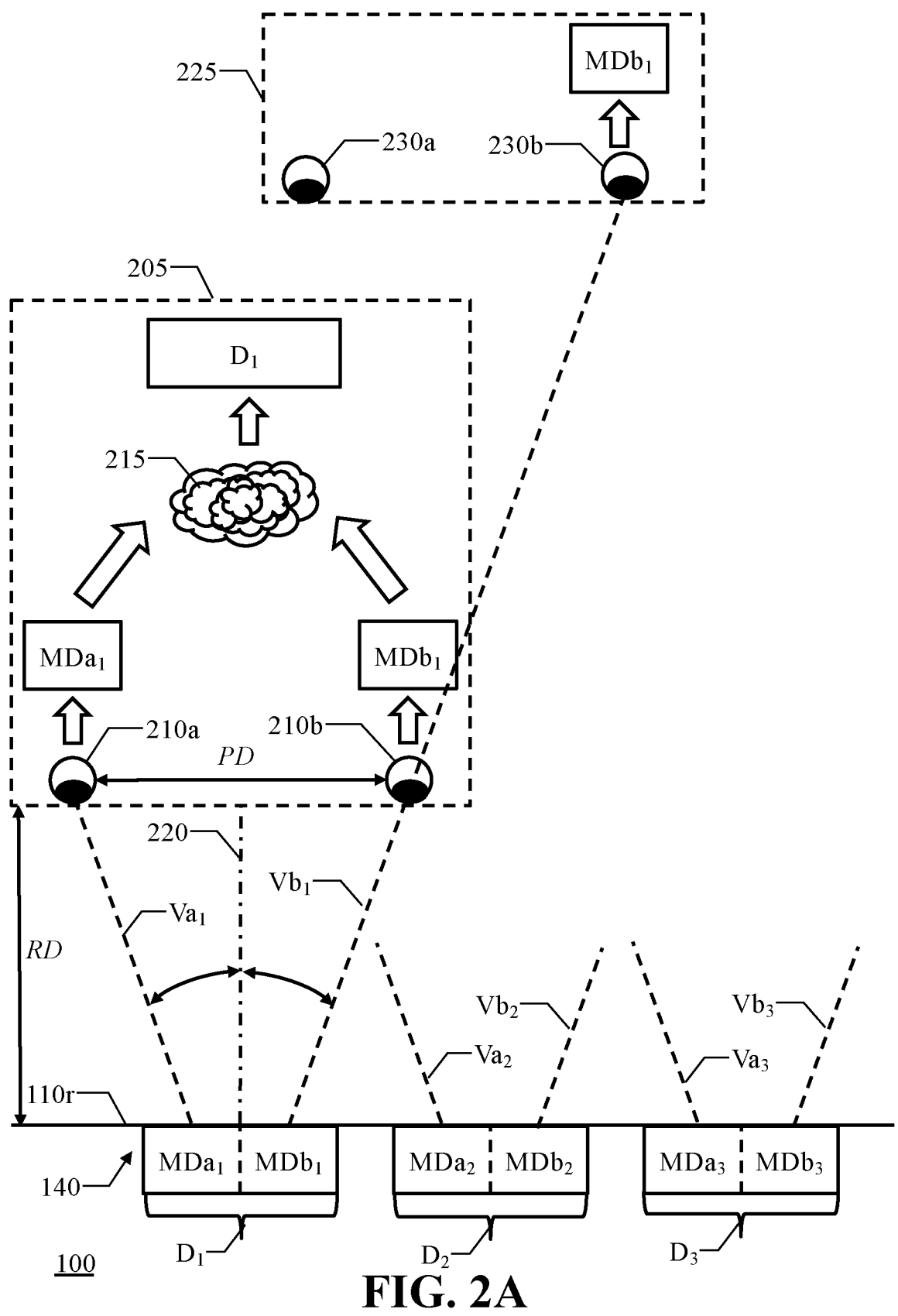
FIG. 2A is a schematic block diagram illustrating a card in a first position according to at least one embodiment.
Figure 2B:
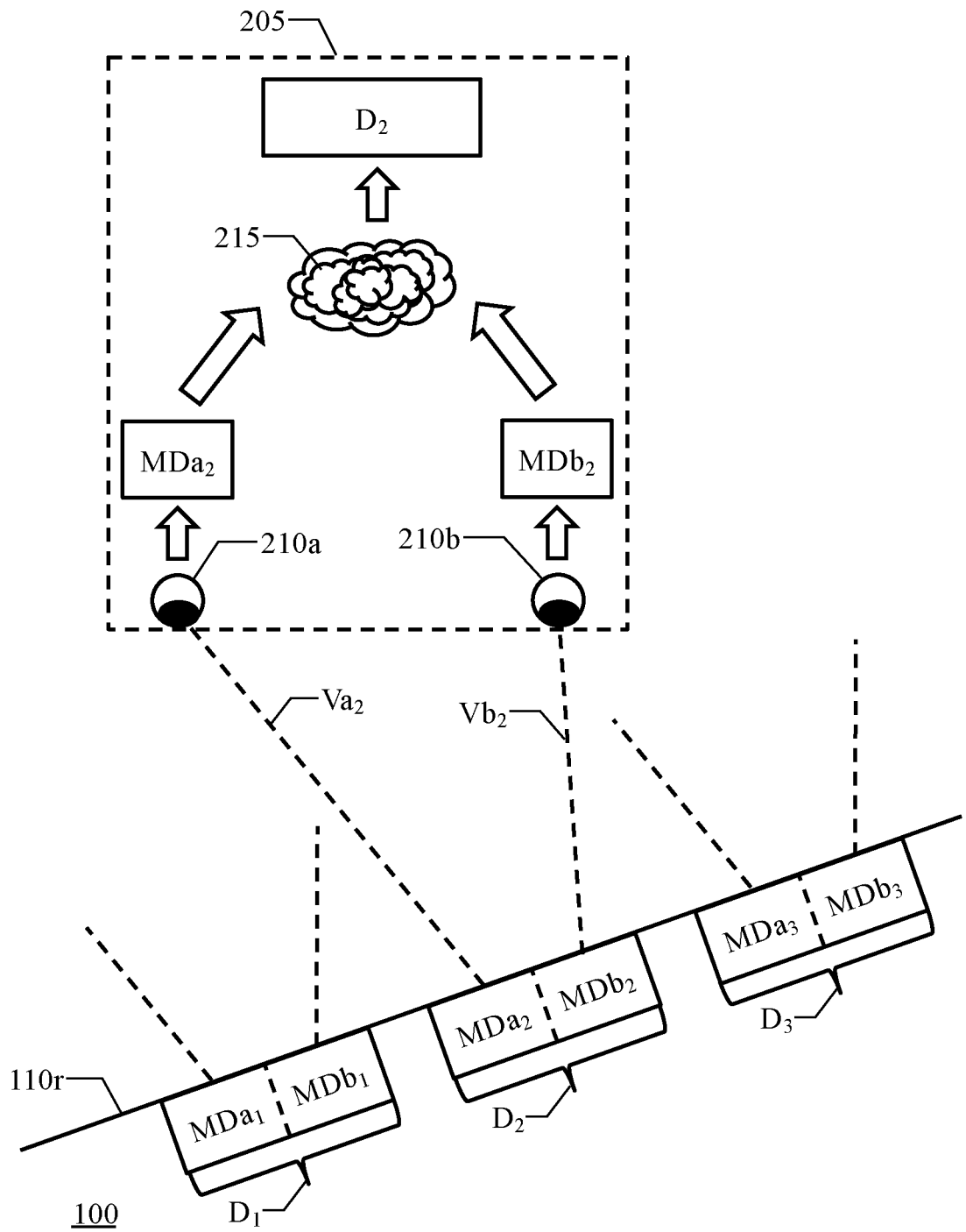
FIG. 2B is a schematic block diagram illustrating a card in a second position according to at least one embodiment.
Figure 2C:
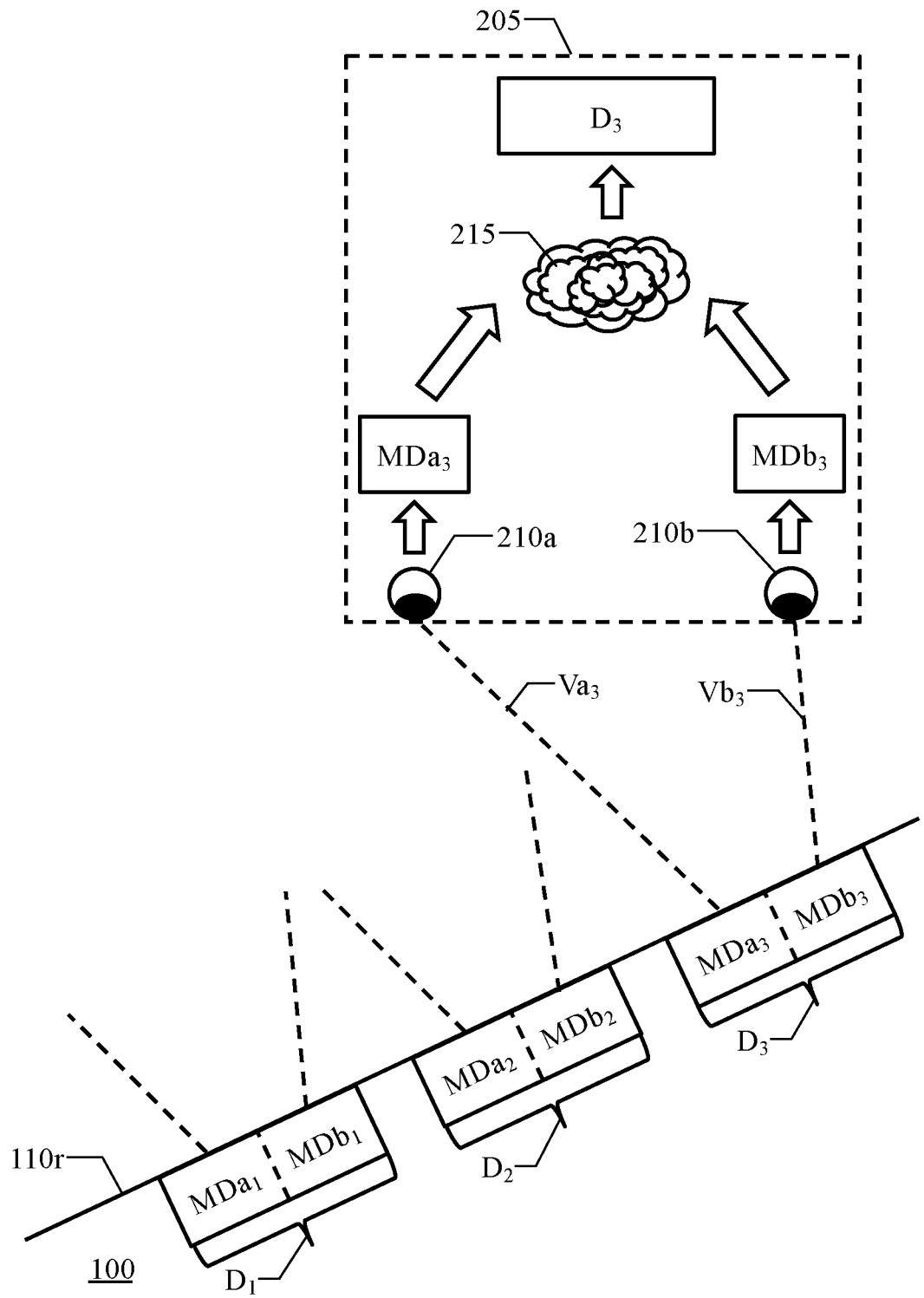
FIG. 2C is a schematic block diagram illustrating a card in a third position according to at least one embodiment.

With reference now to FIG. 2A-FIG. 2C, a conceptual representation is shown of the general principles of the solution according to an embodiment of the present disclosure.

Starting from FIG. 2A, the solution according to an embodiment of the present disclosure is aimed at making safer the display of (security) information that enables the use of the credit card 100. For example, this applies to the security code 140. Generally, the security code 140 is formed by a series of characters (such as three digits). Each of one or more components of the security code 140 is represented with two different (partial) images based on a splitting of its representation. In the example shown in the figure, the components are corresponding (complete) images $D_i$ (with i=1 . . . 3) containing a graphical representation of the digits of the security code 140. For each digit, its partial images $MDa_i$-$MDb_i$ are based on a splitting of the corresponding complete image $D_i$; for example, the partial images $MDa_1$-$MDb_2$ are formed by interleaved strips derived from the complete image $D_1$. When looking at the rear surface 110r of the credit card 100 from a first position, the partial image $MDa_1$ is viewable from a certain angle (cone) of view $Va_1$, whereas the partial image $MDb_2$ is viewable from a different angle (cone) of view $Vb_2$. Each angle of view $Va_1$-$Vb_2$ is defined by a range of values, with the corresponding partial image $MDa_1$-$MDb_2$ that may be seen only within them. Therefore, when the cardholder, denoted with the reference 205, looks at the rear surface 110r so that his/her left eye 210a looks at the partial image $MDa_1$ from the corresponding angle of view $Va_1$ and his/her right eye 210b looks at the partial image $MDb_2$ from the corresponding angle of view $Vb_2$, the (left) eye 210a sees the partial image $MDa_1$ only and the (right) eye 210b sees the partial image $MDb_2$ only. A visual system 215 of the cardholder 205 (and particular the visual cortex of his/her brain dedicated to processing visual information) fuses the partial image $MDa_1$ and the partial image $MDb_2$ (in a sort of stereoscopic imaging) so as to restore the corresponding complete image $D_1$ and then allowing the reading of its digit. The rear surface 110f is configured so that this (reading) operation is possible in standard conditions of use of the credit card 100. Particularly, the cardholder 205 generally looks at the rear surface 110r at a reading distance RD of 150-250 mm; moreover, the cardholder 205 generally has an (inter) pupillary distance PD between the pupils of the eyes 210a-210b of 50-70 mm. For example, considering the angles of view $Va_1$ and $Vb_2$ opposite to each other with respect to a normal 220 to the rear surface 110r, in case of a reading distance RD=200 mm and a pupillary distance PD=60 mm, a (common) absolute value of the angles of view $Va_1$ and $Vb_2$ with respect to the normal 220 is:

$$|Va_i| = |Vb_i| = \arctg\left(\frac{PD/2}{RD}\right) = \arctg\left(\frac{60/2}{200}\right) = \arctg(0.15) = 8.5°.$$

The reading operation is instead not possible when another observer looks at the rear surface 110r at a difference reading distance. Particularly, in case of a person 225, at most only one of his/her eyes 230a and 230b may look at the rear surface 110r from the angles of view $Va_1$ and $Vb_2$. For example, as shown in the figure, if the eye 230b looks at the partial image $MDb_2$ from the corresponding angle of view $Vb_2$, the eye 230a now does not look at the partial image $MDa_1$ from the corresponding angle of view $Va_1$. Therefore, the eye 230b sees the partial image $MDb_2$ but the eye 230a does not see the partial image $MDa_1$. The person 225 is then at most able to see a single partial image (the partial image $MDb_2$ in the example at issue), which is generally unable to reveal the digit of the corresponding complete image $D_1$. Similar considerations apply if a camera (not shown in the figure) is used to shoot the rear surface 110r. In fact, in this case as well the camera shoots the rear surface 110r from a single direction, which may be at most be equal to one of the angles of view $Va_1$ and $Vb_2$. Therefore, in this case as well the camera is at most able to see a single partial image $MDa_1$ or $MDb_2$ that is again generally unable to reveal the digit of the corresponding complete image $D_1$.

The above-mentioned solution significantly increases security of the credit card 100, and more generally of any other device dedicated to displaying security information (to be used to obtain one or more services) to a user. For example, the same solution may also be applied to a mobile computing device, such as a smartphone (not shown in the figure). In this case, a small (security) screen portion may be dedicated to displaying security information (such as PINs of payment cards). Particularly, the smartphone runs a security app and/or accesses an on-line service (or more) that are used to store the security information in an encrypted database (locally or remotely, respectively). Whenever a user of the smartphone needs to see a specific piece of security information (such as a PIN of a payment card to be used per performing a payment at a POS terminal or a withdrawal at an ATM terminal), the user unlocks the encrypted database by entering a corresponding master password (such as via its touch-screen) and selects the desired piece of security information. In this case, the piece of information is displayed as above in the security screen portion. Therefore, the piece of information may be seen only by the user of the smartphone (looking at the screen at the expected reading distance), but not by any other observer looking at the screen from a difference reading distance.

The solution according to an embodiment of the present invention substantially reduces the risks of eavesdropping of the security information.

This is especially useful whenever the corresponding device is used in a public location (for example, when a credit card is used in a shop or a PIN is read from the smartphone at a POS/ATM terminal). In fact, the solution according to an embodiment of the present disclosure makes it possible to read the security information by the user actually holding the device (the credit card or the smartphone in the example at issue). However, this is not possible (or at least very difficult) in any other conditions (such as by a person in proximity of the user or by a remote camera). This significantly reduces the risk that the security information may be stolen and then used fraudulently (such as for performing payments/withdrawals).

In a specific implementation of the solution according to an embodiment of the present disclosure, when the security code 140 comprises multiple components (e.g., its three digits represented by the complete images $D_1$, $D_2$, $D_3$), they may be seen in succession by changing a relative position of the credit card 100 with respect to the cardholder 205 (for example, by moving the credit card 100). For this purpose, the partial images $MDa_1$ and the partial images $MDb_2$ are viewable from the corresponding angles of view $Va_1$ and angles of view $Vb_2$, respectively, that have corresponding common values (opposite to each other in the example at issue). Therefore, in the condition shown in the figure, the cardholder 205 only sees the complete image $D_1$, whereas it is unable to see the partial images $MDa_2$-$MDb_2$,$MDa_3$-$MDb_3$ of the other complete images $D_2$-$D_3$ (since s/he is looking at the rear surface 110r from directions different from their angles of view $Va_2$-$Va_3$).

Moving to FIG. 2B, the cardholder 205 slightly moves the credit card 100 to another position (e.g., second position), by rotating and/or translating it, until the eye 210a looks at the partial image $MDa_2$ from the corresponding angle of view $Va_2$ and the eye 210b looks at the partial image $MDb_2$ from the corresponding angle of view $Vb_2$ with respect to the rear surface 110r. As a consequence, the eye 210a sees the partial image MDa$_2$ only and the eye 210b sees the partial image MDb$_2$ only. As above, the visual system 215 of the cardholder 205 fuses the partial image MDa$_2$ and the partial image MDb$_2$, so as to restore the corresponding complete image D$_2$ and then allowing reading its digit.

Moving to FIG. 2C, the cardholder 205 further slightly moves the credit card 100 to another position (e.g., third position), by rotating and/or translating it, until the eye 210a looks at the partial image MDa$_3$ from the corresponding angle of view Va$_3$ and the eye 210b looks at the partial image MDb$_3$ from the corresponding angle of view Vb$_3$ with respect to the rear surface 110r. As a consequence, the eye 210a sees the partial image MDa$_3$ only and the eye 210b sees the partial image MDb$_3$ only. As above, the visual system 215 of the cardholder 205 fuses the partial image MDa$_3$ and the partial image MDb$_3$, so as to restore the corresponding complete image D$_3$ and then allowing reading its digit.

As a result, at any time only a portion of the security code (or more generally of any other security information) may be seen. This adds further security, since it is very difficult (if not impossible) to see the whole security information at the same time.

Figure 3:
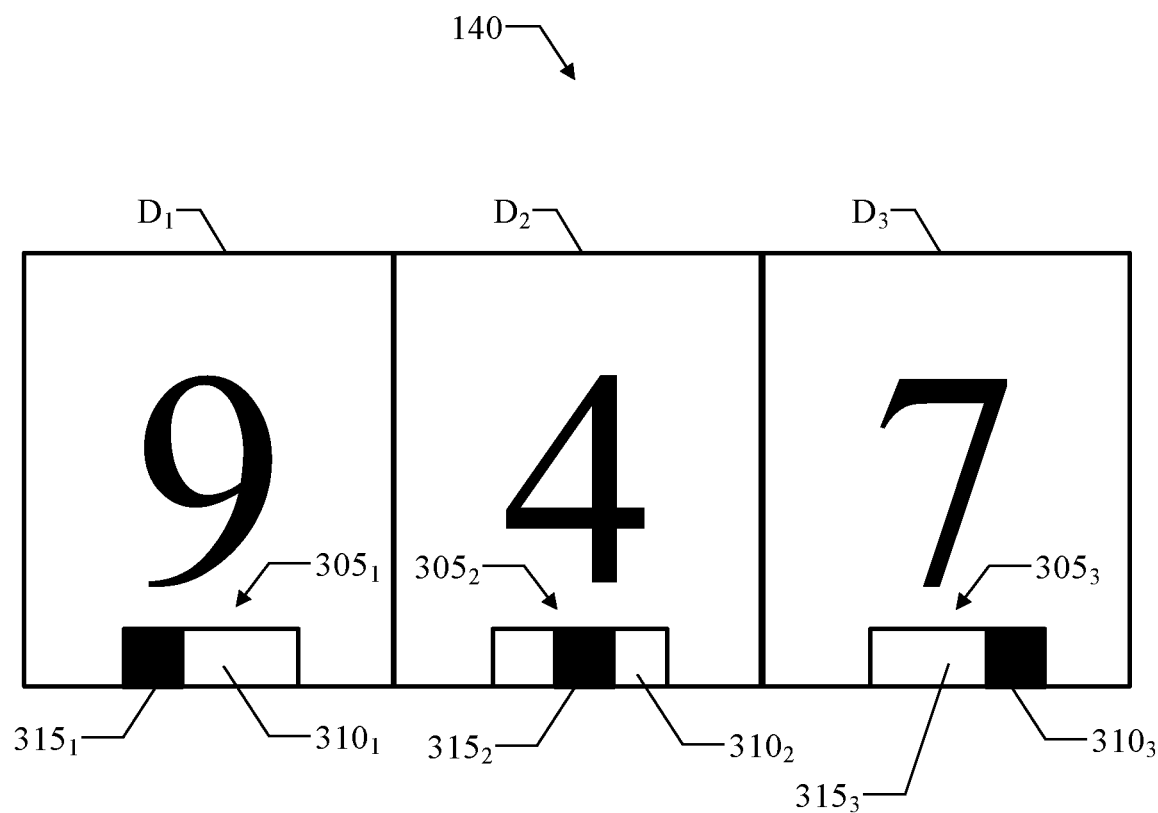
FIG. 3 is a schematic block diagram illustrating an exemplary application according to at least one embodiment.

With reference now to FIG. 3, an exemplary application is shown of the solution according to an embodiment of the present disclosure.

Particularly, the figure shown the complete images D$_i$ of a generic security code 140 ("947" in the example at issue). In a specific implementation of the solution according to an embodiment of the present disclosure, each complete images D$_i$ comprises, in addition to a representation of the corresponding digit ("9" in the complete image D$_1$, "4" in the complete image D$_2$ and "7" in the complete image D$_3$ in this case) a corresponding progress element 305$_i$ (which contributes as well to define the corresponding partial images, not shown in the figure). The progress element 305$_i$ provides an indication of a progress of the display of the digits of the security code 140 when this occurs in succession (by changing the relative position of the credit card 100 with respect to the cardholder, not shown in the figure). For example, the progress element 305$_i$ comprises a bar 310$_i$ with a marker 315$_i$ (such as a dark square) inside it; the marker 315$_i$ moves along the bar 310$_i$ according to the position of the digit of the complete image D$_i$ within the security code 140, i.e., from left to right with the marker 315$_1$ at the left end of the bar 310$_1$, the marker 315$_2$ at the center of the bar 310$_2$ and the marker 315$_3$ at the right end of the bar 310$_3$. This significantly facilitates the reading of the digits of the security code 140 in the correct order.

Figure 4:
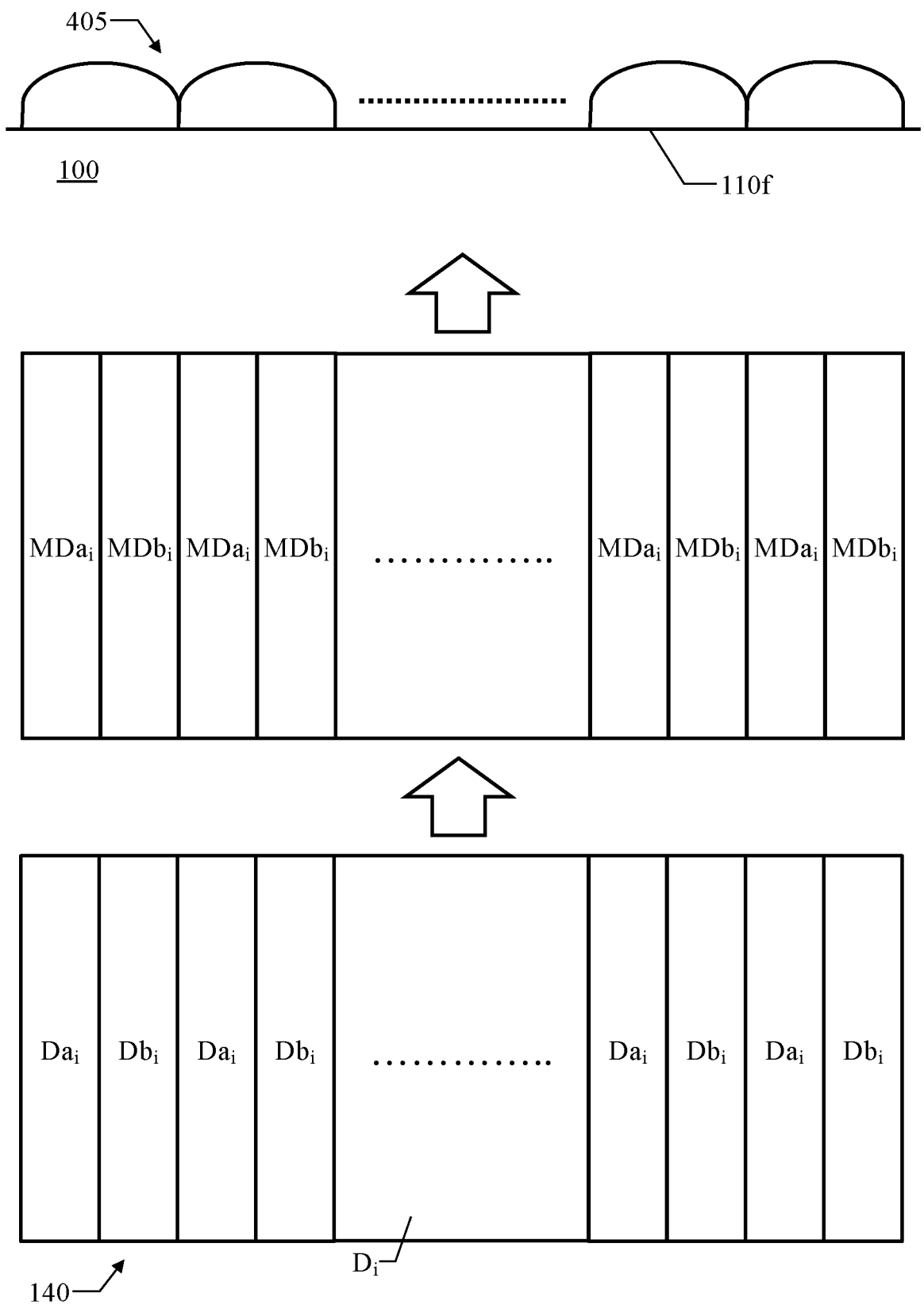
FIG. 4 is a schematic block diagram illustrating an implementation of a solution according to at least one embodiment.

With reference now to FIG. 4, a schematic representation is shown of an implementation of the solution according to an embodiment of the present disclosure.

In this case, the security code 140 is provided by lenticular printing on the rear surface 110r of the credit card 100. A layer of lenticular lenses 405 covers the security code 140.

More specifically, each complete image D$_i$ of the security code 140 (only one shown in the figure) is split into relatively tiny strips (e.g., pixel columns), for example, with a pitch of 2-10 strips per mm. The complete image D$_i$ then comprises odd strips and even strips being interleaved, which as a whole define an encoding image Da$_i$ and an encoding image Db$_i$, respectively. A perspective distortion is applied to the encoding images Da$_i$-Db$_i$ to compensate for the one applied by the lenticular lenses 405 (e.g., lenticular lens distortion). This provides corresponding (distorted) odd strips and even strips being interleaved, which as a whole define the partial image MDa$_i$ and the partial image MDb$_i$, respectively. The partial images MDa$_i$-MDb$_i$ are then printed on the rear surface 110r (for example, with a lithographic offset printing process at high resolution, such as of the order of 5-20 μm).

Each lenticular lens 405 is designed so that when viewed from slightly different angles of view it shows different parts of an image below it. In this specific case, each lenticular lens 405 is arranged over a pair of adjacent strips of the partial images MDa$_i$-MDb$_i$, so as to show the strip of the partial image MDa$_i$ or the strip of the partial image MDb$_i$ according to the angle of view from which it is viewed. For example, the lenticular lenses 405 are formed by a substrate of plastic material (such as PETG, PMMA or PS), which is molded to form a series of partial cylindrical elements defining them. This implementation may be cost-effective, since it simply requires the addition of the layer of lenticular lenses 405 (a mere passive component) to the credit card 100.

Figure 5:
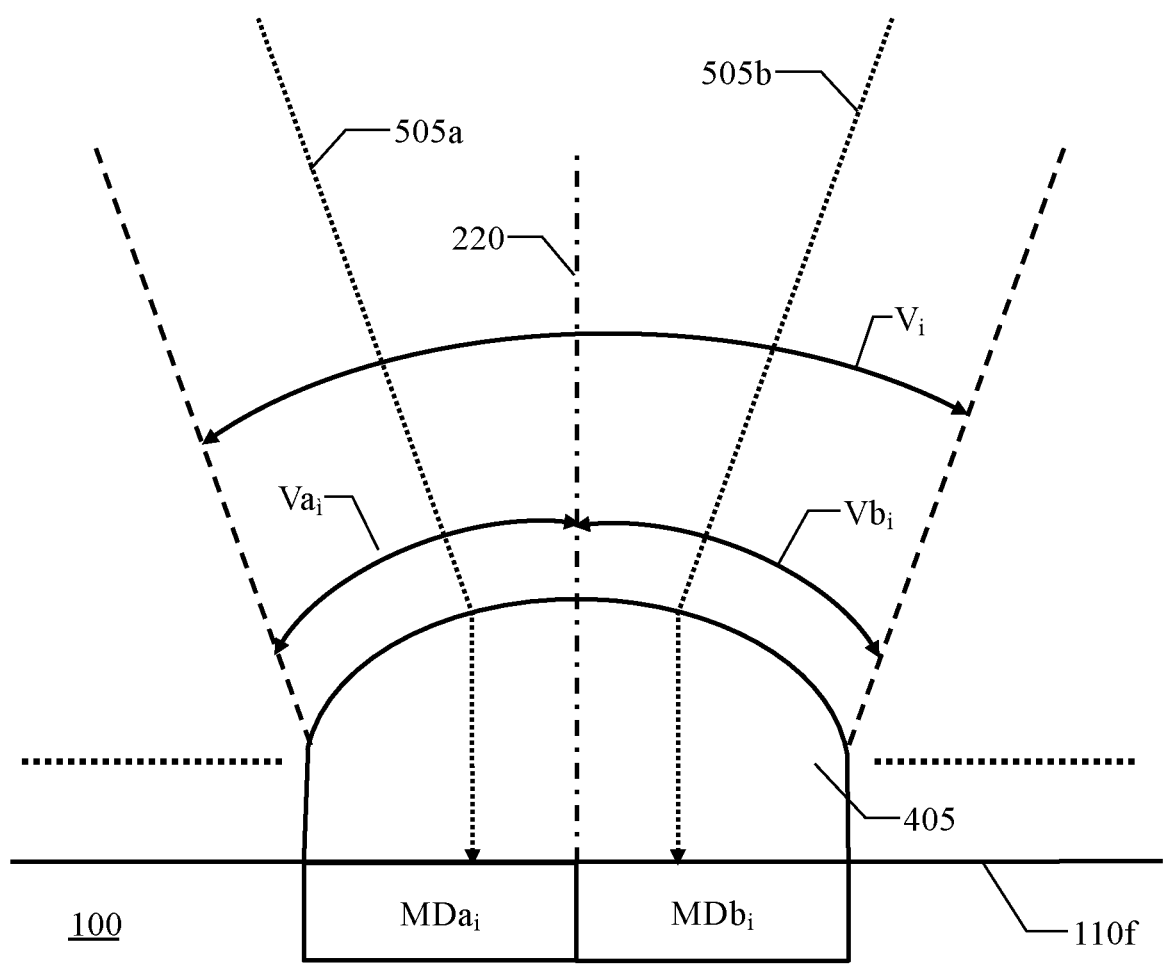
FIG. 5 is a schematic block diagram illustrating a particular implementation of the solution according to at least one embodiment.

With reference now to FIG. 5, a functional representation is shown of a particular of this implementation of the solution according to an embodiment of the present disclosure.

The figure shows a generic lenticular lens 405 that covers the corresponding partial images MDa$_i$ and MDb$_i$. The lenticular lens 405 has a full angle (cone) of view V$_i$. The full angle of view V$_i$ is defined by a range of values, outside which nothing under the lenticular lens 405 is seen. The full angle of view V$_i$ is split into the angle of view Va$_i$ (within which the partial image MDa$_i$ is seen) and the angle of view Vb$_i$ (within which the partial image MDa$_i$ is seen). In case the lenticular lens 405 is symmetric with respect to the normal 220 to the rear surface 110f of the credit card 100, the angles of view Va$_i$ and Vb$_i$ are symmetric with respect to the normal 220 as well. For example, the angles of view Va$_i$ and Vb$_i$ have a same range of absolute values with respect to the normal 220 equal to 0-17°, preferably 0-15° and still more preferably 0-12°, such as 0-10°. Therefore, when an observer looks at the lenticular lens 405 from a direction inside the angle of view Va$_i$, as the one denoted with the reference 505a in the figure, the observer will see the partial image MDa$_i$, whereas when an observer looks at the lenticula lens 405 from a direction inside the angle of view Vb$_i$, as the one denoted with the reference 505b in the figure, the observer will see the partial image MDb$_i$.

Figure 6:
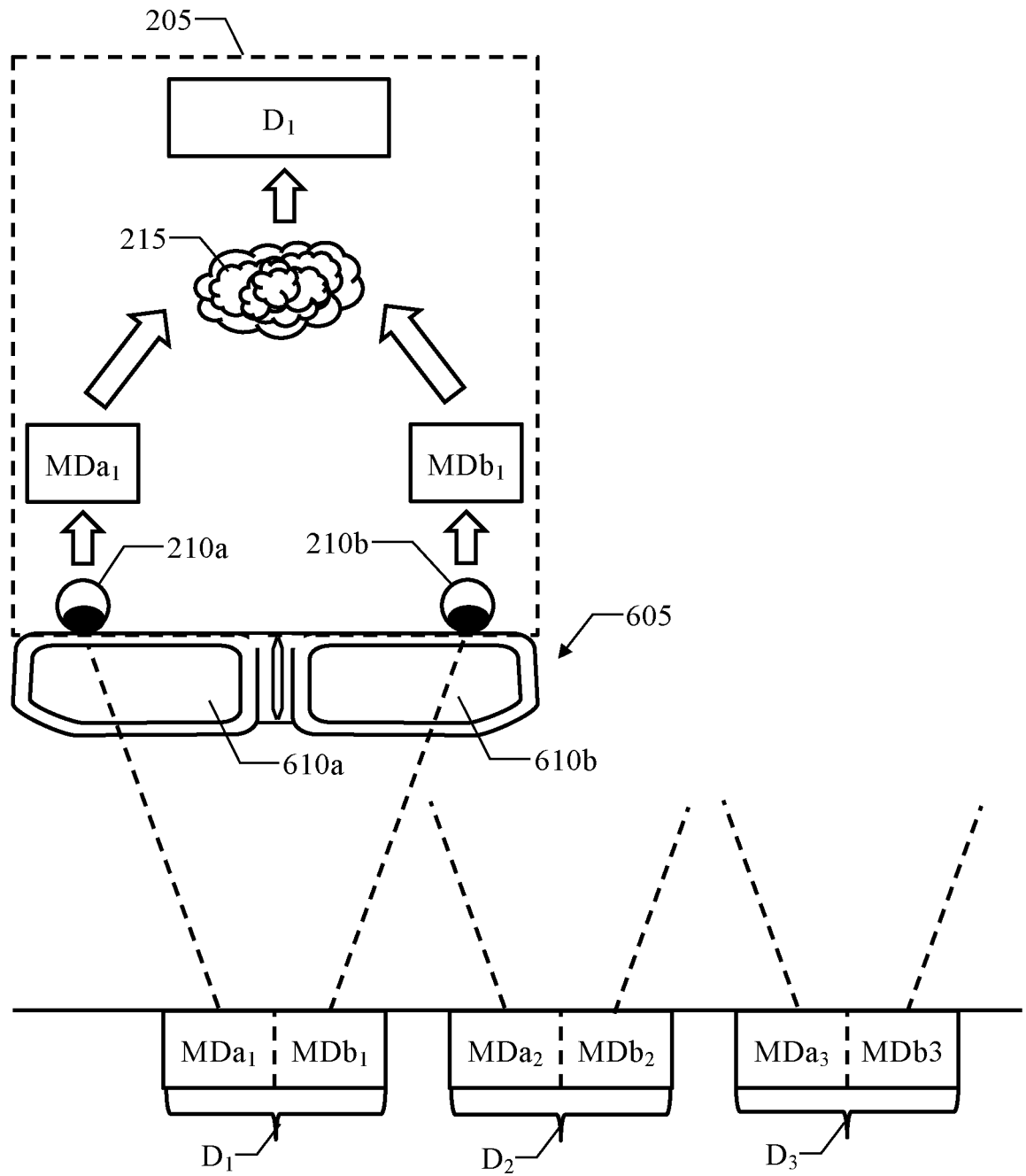
FIG. 6 is a schematic block diagram illustrating a further implementation of the solution according to at least one embodiment.

With reference now to FIG. 6, a schematic representation is shown of a further implementation of the solution according to an embodiment of the present disclosure.

In this case, an anaglyph technique is applied. More specifically, the partial images MDa$_i$ and the partial images MDa$_i$ are provided in different colors; the colors are typically chromatically opposite to each other, such as red and cyan. The cardholder 205 now looks at the partial images MDa$_i$-MDa$_i$ with anaglyph glasses 605. The anaglyph glasses 605 have a left lens 610a that makes the corresponding eye 210a perceive graduations of red to cyan as graduations of bright to dark; conversely, the anaglyph glasses 605 has a right lens 610b that makes the corresponding eye 210b perceive graduations of cyan to red as graduations of bright to dark. Therefore, the (left) lens 610a and the (right) lens 610b filter out areas of the opposite color (cyan and red, respectively), so that the eye 210a sees the partial image MDa$_i$ only and the eye 210b sees the partial image MDb$_i$ only. As above, the visual system 215 of the cardholder 205 fuses the partial image MDa$_i$ and the partial image MDb$_i$, so as to restore the corresponding complete image D$_i$ and then allowing its reading. This implementation further improves security.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may be practiced even without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, unless otherwise indicated, the terms "substantially", "about", "approximately" and the like should be understood as within 10%, preferably 5% and still more preferably 1%. Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a device for displaying security information. However, the device may be of any type (for example, a passive device such as a payment card, a plastic card with multiple second level passwords and son on, an active device such as a smartphone, a tablet and so on) for displaying any security information (for example, security code, card number, cardholder name, expiration date, PIN, password and so on).

In an embodiment, the security information is to be used to obtain one or more services by a user of the device. However, the services may be in any number and of any type (for example, e-payments, payments at POS terminals, withdrawals of money at ATM terminals, accesses to UserIDs, accesses to protected sites and so on).

In an embodiment, the device comprises a display surface. However, the display surface may be of any type (for example, a surface of a physical support, a screen, a panel and so on).

In an embodiment, the display surface is configured to display corresponding first images and second images based on a splitting of a representation of one or more components of the security information. However, the components may be in any number and of any type (for example, characters, symbols, words, graphical signs and so on); moreover, each pair of first/second images may be based on the splitting of the representation of the corresponding component in any way (for example, obtained by splitting it into strips, blocks, tiles and the like, applying any number and type of processing to the portions so obtained, down to none, and so on).

In an embodiment, the first images and the second images are viewable from corresponding first angles of view and second angles of view, respectively, with respect to the display surface. However, the first/second angles of view may be defined by any ranges, down to single values; moreover, this result may be achieved in any way (for example, with lenticular lenses, parallax barriers, volumetric displays, holography displays and so on).

In an embodiment, the first image and the second image of each of the components are fused into the representation of the component by a visual system of the user looking at the display surface at a reading distance at which a first eye of the user looks at the first image from the corresponding first angle of view and a second eye of the user looks at the second image from the corresponding second angle of view. However, the reading distance may have range, down to a single value.

Further embodiments provide additional advantageous features, which may however be omitted at all in a basic implementation.

In an embodiment, the display surface is configured to display the corresponding first images and second images based on the splitting of the representation of a plurality of the components. However, the possibility is not excluded of treating the whole security information as a single component.

In an embodiment, the first images and the second images of the components are fused in succession into the representation of the corresponding components by the visual system of the user in response to a change of a relative position of the device with respect to the user thereby looking in succession at the display surface with the first eye and the second eye from the corresponding first angles of view and second angles of view, respectively. However, the relative position may be changed in any way (for example, by moving the device, the user or both of them, by rotating around any axis, translating along any direction, their combination and so on).

In an embodiment, the first images and second images are viewable from the corresponding first angles of view and second angles of view, respectively, being a common first angle of view and a common second angle of view, respectively. However, the common first/second angles of view may be of any type (for example, symmetric with the same absolute value, asymmetric with different absolute values and so on); in any case, the possibility is not excluded of having the first/second angles of view varying across the components.

In an embodiment, the components comprise corresponding progress elements providing an indication of a progress of a display of the components in response to said change of the relative position. However, the progress elements may be of any type (for example, any graphical elements such as moving markers, lengthening bars and so on, alphanumerical elements such as progressive numbers, consecutive letters and so on), down to none.

In an embodiment, the first image and the second image of each component are unable to reveal the component. However, the first/second images may be completely unable to reveal the component, may only hinder its recognition and so on; moreover, the case is not excluded wherein the components (or part of them) may be envisaged from their first images or second images (for example, when the components are never visible all together).

In an embodiment, the display surface is provided with lenticular printing of the first images and the second images. However, the lenticular printing may be of any type (for example, splitting the representation of each component into any number and type of portions, leaving the portions of the first/second images interleaved, grouping the portions of the first/second images and so on) and provided in any way (for example, directly on the viewing surface of the device, on a back of the layer of lenticular lenses and so on).

In an embodiment, the display surface comprises a layer of lenticular lenses covering the first images and the second images. However, the lenticular lenses may be in any number (for example, one for each pair of adjacent portions of the first/second images, one for each group of two or more pairs of adjacent portions of the first/second images, one for each component and so on), of any form (such as elongated, circular and so on) and size; moreover, the layer of lenticular lenses may be of any material and provided in any way (for example, glued, laminated and so on).

In an embodiment, the first image and the second image of each of the components are formed by interleaved strips of the representation of the component being distorted to compensate a distortion of the lenticular lenses (e.g., lenticular lens distortion). However, the strips may be in any number and of any width, and they may be distorted in any way (for example, to compensate perspective, warping, zooming and so on).

In an embodiment, the display surface is provided with the first images and the second images in a first color and a second color, respectively. However, the colors may be of any type (for example, red/cyan, red/blue, red/green and so on).

In an embodiment, the first image and the second image of each of the components are fused into the representation of the component by the visual system of the user looking at the display surface with anaglyph glasses filtering out the second color for the first eye and the first color for the second eye. However, the anaglyph glasses may be of any type (for example, red sharpened anaglyph glasses, anachrome filters and so on).

In an embodiment, the components are corresponding characters. However, the characters may be of any type (for example, numbers, letters, symbols and so on).

In an embodiment, the first angle of view and the second angle of view of each of the components are spaced apart by 50-80 mm at the reading distance of 150-350 mm. However, any other definition of the angles of view is possible; moreover, the possibility is not excluded of obtaining the desired result with reference to different values.

In an embodiment, the angles of view are 5-12° with respect to a normal to the display surface. However, different values of the angles of view are not excluded (for example, for use by visual impaired persons).

In an embodiment, the device is a card having the display surface. However, the card may be of any shape, size and material, and the display surface may be any one of it (for example, the rear surface, the front surface and so on).

In an embodiment, the device is a payment card. However, the payment card may be of any type (for example, a credit card, a debit card, a rechargeable card and so on).

In an embodiment, the security information comprises a security code of the payment card. However, the security code may be of any type (for example, with any length, format and so on).

Generally, similar considerations apply if the device has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

An embodiment provides a method for displaying security information. In an embodiment, the security information is to be used to obtain one or more services by a user. In an embodiment, the method comprises providing a device to the user. In an embodiment, the device comprises a display surface. In an embodiment, the display surface is configured to display corresponding first images and second images based on a splitting of a representation of one or more components of the security information. In an embodiment, the first images and the second images are viewable from corresponding first angles of view and second angles of view, respectively, with respect to the display surface. In an embodiment, the method comprises looking at the display surface by the user at a reading distance at which a first eye of the user looks at the first image from the corresponding first angle of view and a second eye of the user looks at the second image from the corresponding second angle of view. In an embodiment, this causes a visual system of the user to fuse the first image and the second image of each of the components into the representation of the component. However, the same considerations pointed out above with respect to the device apply to the corresponding steps of the method as well.

Further embodiments provide additional advantageous features, which may however be omitted at all in a basic implementation.

In an embodiment, the method comprises using the security information by the user to obtain one or more of the services. However, the security information may be used in any way (for example, entered into a web page, a POS terminal, an ATM terminal and so on); in any case, the possibility is note excluded to display the security information for a different purpose (for example, remember, verify and so on it).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

What is claimed is:

1. A security device, comprising:
a non-electronic display surface; and
a security information including a plurality of complete images integrated with the non-electronic display surface, wherein the plurality of complete images are not viewable by a user at a same time, wherein an individual complete image of the plurality of complete images is encoded by a first partial image and a second partial image such that seeing a single partial image of the first partial image and the second partial image does not reveal the individual complete image to the user, wherein the first partial image is viewable by the user from a first angle of view relative to the non-electronic display surface and the second partial image is viewable by the user from a second angle of view relative to the non-electronic display surface, wherein the individual complete image is revealed by a visual system of the user responsive to the user simultaneously seeing both the first partial image from the first angle of view with a first eye of the user and the second partial image from the second angle of view with a second eye of the user, and wherein the plurality of complete images further comprises corresponding progress elements that include a marker that visually moves across the corresponding progress elements to indicate a progress of displaying the plurality of complete images responsive to changing the relative position of the security device with respect to the user.

2. The security device of claim 1, wherein the plurality of complete images includes corresponding first partial images and corresponding second partial images associated with encoding respective individual complete images of the plurality of complete images, wherein the corresponding first partial images are viewable from corresponding first angles of view relative to the non-electronic display surface and the corresponding second partial images are viewable from corresponding second angles of view relative to the non-electronic display surface, the corresponding first partial images and the corresponding second partial images being fused in succession to reveal the plurality of complete images by the visual system of the user responsive to a change of a relative position of the security device with respect to the user looking at the non-electronic display surface from the corresponding first angles of view and the corresponding second angles of view.

3. The security device of claim 2, wherein the corresponding first angles of view associated with the corresponding first partial images and the corresponding second angles of view associated with the corresponding second partial images are opposite to each other relative to a normal of the non-electronic display surface.

4. The security device of claim 1, wherein the security information integrated with the non-electronic display surface further comprises a lenticular printing of the first partial image and the second partial image.

5. The security device of claim 4, wherein the non-electronic display surface further comprises a layer of lenticular lenses covering the first partial image and the second partial image.

6. The security device of claim 5, wherein the first partial image and the second partial image of the individual complete image further comprises a plurality of pixel columns that are interleaved, and wherein the first partial image and the partial second image of the individual complete image includes a perspective distortion to compensate for a lenticular lens distortion.

7. The security device of claim 1, wherein the first partial image includes a first color and the second partial image includes a second color, the first partial image and the second partial image being fused into a representation of the individual complete image by the visual system of the user looking at the non-electronic display surface with a pair of anaglyph glasses, wherein the pair of anaglyph glasses are configured to filter out the second color for the first eye of the user and filter out the first color for the second eye of the user.

8. The security device of claim 1, wherein the individual complete image is selected from the group consisting of a character, a symbol, a word, and a graphical sign.

9. The security device of claim 1, wherein the first angle of view and the second angle of view associated with the individual complete image are spaced apart by 50-80 millimeters (mm) at a reading distance of 150-350 mm.

10. The security device of claim 1, wherein the first angle of view and the second angle of view associated with the individual complete image range from 5-12° with respect to a normal defined by the non-electronic display surface.

11. The security device of claim 1, wherein the non-electronic display surface corresponds to a surface of a card.

12. The security device of claim 11, wherein the card further comprises a payment card, and wherein the security information further comprises a security code of the payment card.

13. A method for displaying a security information to a user, comprising:
providing a security device to the user, wherein the security device comprises a non-electronic display surface configured to display a security information, wherein the security information includes a plurality of complete images, wherein the plurality of complete images are not viewable by the user at a same time, wherein an individual complete image of the plurality of complete images is encoded by a first partial image and a second partial image such that seeing a single partial image of the first partial image and the second partial image does not reveal the individual complete image to the user, wherein the first partial image is viewable by the user from a first angle of view relative to the non-electronic display surface and the second partial image are viewable by the user from a second angle of view relative to the non-electronic display surface, and wherein the plurality of complete images further comprises corresponding progress elements that include a marker that visually moves across the corresponding progress elements to indicate a progress of displaying the plurality of complete images responsive to changing the relative position of the security device with respect to the user; and
in response to the user looking at the non-electronic display surface of the security device such that the user simultaneously sees both the first partial image from the first angle of view with a first eye of the user and the second partial image from the second angle of view with a second eye of the user, causing a visual system of the user to reveal the individual complete image.

14. The method of claim 13, wherein the plurality of complete images includes corresponding first partial images and corresponding second partial images associated with encoding respective individual complete images of the plurality of complete images, wherein the corresponding first partial images are viewable from corresponding first angles of view relative to the non-electronic display surface and the corresponding second partial images are viewable from corresponding second angles of view relative to the non-electronic display surface; and
in response to the user changing a relative position of the security device to look at the non-electronic display surface from the corresponding first angles of view and the corresponding second angles of view, fusing the corresponding first partial images and the corresponding second partial images in succession into the plurality of complete images by the visual system of the user.

15. The method of claim 13, further comprising:
looking at the non-electronic display surface of the security device at a reading distance of 150-350 millimeters (mm).

16. The method of claim 14, further comprising:
in response to the user looking at the non-electronic display surface of the security device at a first position, seeing only a representation of a first complete image of the plurality of complete images, wherein the user is unable to see the corresponding first partial images and the corresponding second partial images associated with other complete images of the plurality of complete images from the first position.

17. The method of claim 13, wherein the individual complete image is selected from the group consisting of a character, a symbol, a word, and a graphical sign.

* * * * *